US009573525B2

(12) United States Patent
Minikey, Jr. et al.

(10) Patent No.: US 9,573,525 B2
(45) Date of Patent: Feb. 21, 2017

(54) MIRROR MOUNTING ASSEMBLY

(71) Applicant: Gentex Corporation, Zeeland, MI (US)

(72) Inventors: Danny L. Minikey, Jr., Fenwick, MI (US); Nigel T. Lock, Holland, MI (US); Jeremy A. Fogg, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 561 days.

(21) Appl. No.: 14/011,105

(22) Filed: Aug. 27, 2013

(65) Prior Publication Data

US 2014/0055617 A1 Feb. 27, 2014

Related U.S. Application Data

(60) Provisional application No. 61/693,359, filed on Aug. 27, 2012.

(51) Int. Cl.
*B60R 1/04* (2006.01)
*F16F 1/32* (2006.01)
*B60N 2/50* (2006.01)
*H01M 2/10* (2006.01)
*B60R 1/12* (2006.01)
*B60R 11/00* (2006.01)
*B60R 11/04* (2006.01)

(52) U.S. Cl.
CPC .............. *B60R 1/04* (2013.01); *B60N 2/502* (2013.01); *B60R 1/12* (2013.01); *B60R 11/00* (2013.01); *F16F 1/32* (2013.01); *H01M 2/10* (2013.01); *B60R 11/04* (2013.01); *B60R 2011/0033* (2013.01); *Y10T 29/49826* (2015.01)

(58) Field of Classification Search
CPC .............. B60R 1/04; B60R 11/04; B60R 1/12; B60R 11/00; B60R 2011/0033; Y10T 29/49826
USPC ....................... 359/843, 871–877; 701/36, 49
See application file for complete search history.

(56) References Cited

U.S. PATENT DOCUMENTS 5,820,097 A * 10/1998 Spooner .................... B60R 1/04
 248/475.1
6,250,148 B1 6/2001 Lynam
6,299,319 B1 10/2001 Mertens et al.
(Continued)

FOREIGN PATENT DOCUMENTS

JP 2004082829 3/2004
JP 2007112206 5/2007

OTHER PUBLICATIONS

Patent Cooperation Treaty, International Searching Authority, International Search Report, Written Opinion of the International Searching Authority and Notification of Transmittal, Nov. 28, 2013, 6 Pages.

*Primary Examiner* — Jennifer L. Doak
(74) *Attorney, Agent, or Firm* — Price Heneveld LLP; Bradley D. Johnson

(57) ABSTRACT

A mirror mounting assembly for a rearview mirror, including a housing connector having a first pivot member operably connected with an extension tube. A mount includes a windshield bracket and a sensor assembly. The windshield bracket is proximate to the sensor assembly and supports the sensor assembly against the vehicle windshield. A second pivot member includes a first end operably connected with the extension tube and a second end operably connected with the mount.

20 Claims, 18 Drawing Sheets

(56) References Cited

U.S. PATENT DOCUMENTS

| | | | |
|---|---|---|---|
| 6,326,613 B1* | 12/2001 | Heslin | B60R 1/04 |
| | | | 250/214 AL |
| 6,326,900 B2* | 12/2001 | DeLine | 340/425.5 |
| 6,341,523 B2 | 1/2002 | Lynam | |
| 6,516,664 B2 | 2/2003 | Lynam | |
| 6,968,736 B2 | 11/2005 | Lynam | |
| 7,667,579 B2 | 2/2010 | DeLine et al. | |
| 8,309,907 B2 | 11/2012 | Heslin et al. | |
| 8,456,311 B2* | 6/2013 | Wohlfahrt | B60S 1/0822 |
| | | | 248/309.1 |
| 9,244,249 B2* | 1/2016 | Kim | B60R 1/04 |
| 2010/0195226 A1* | 8/2010 | Heslin | B60R 1/04 |
| | | | 359/844 |
| 2014/0091588 A1* | 4/2014 | Renke | B60R 13/0206 |
| | | | 296/1.08 |
| 2014/0226012 A1* | 8/2014 | Achenbach | B60R 11/04 |
| | | | 348/148 |
| 2015/0030319 A1* | 1/2015 | Matori | G03B 17/561 |
| | | | 396/419 |

* cited by examiner

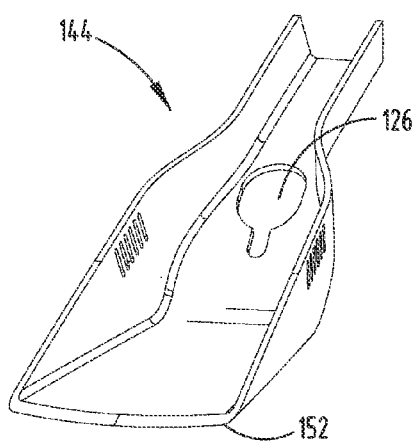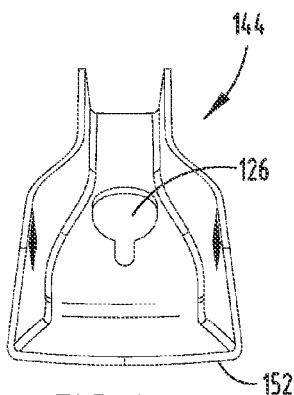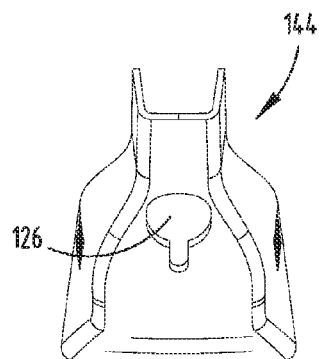
FIG. 45　　　　FIG. 46　　　　FIG. 47
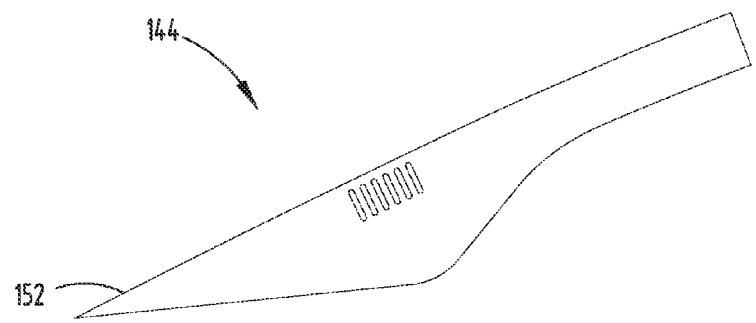
FIG. 48
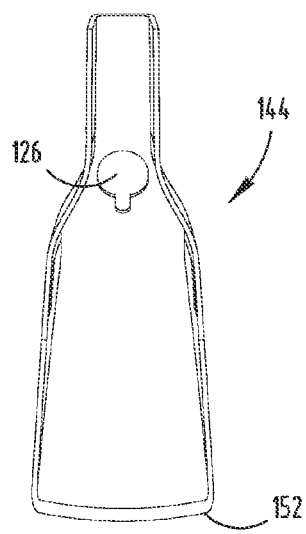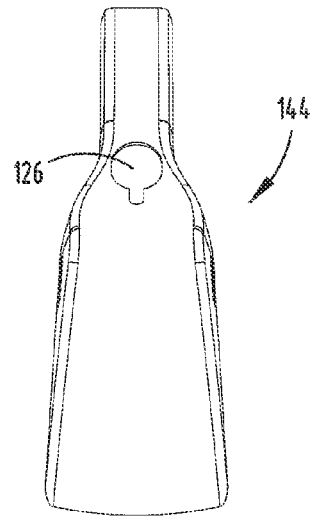
FIG. 49　　　　　　　　　　FIG. 50

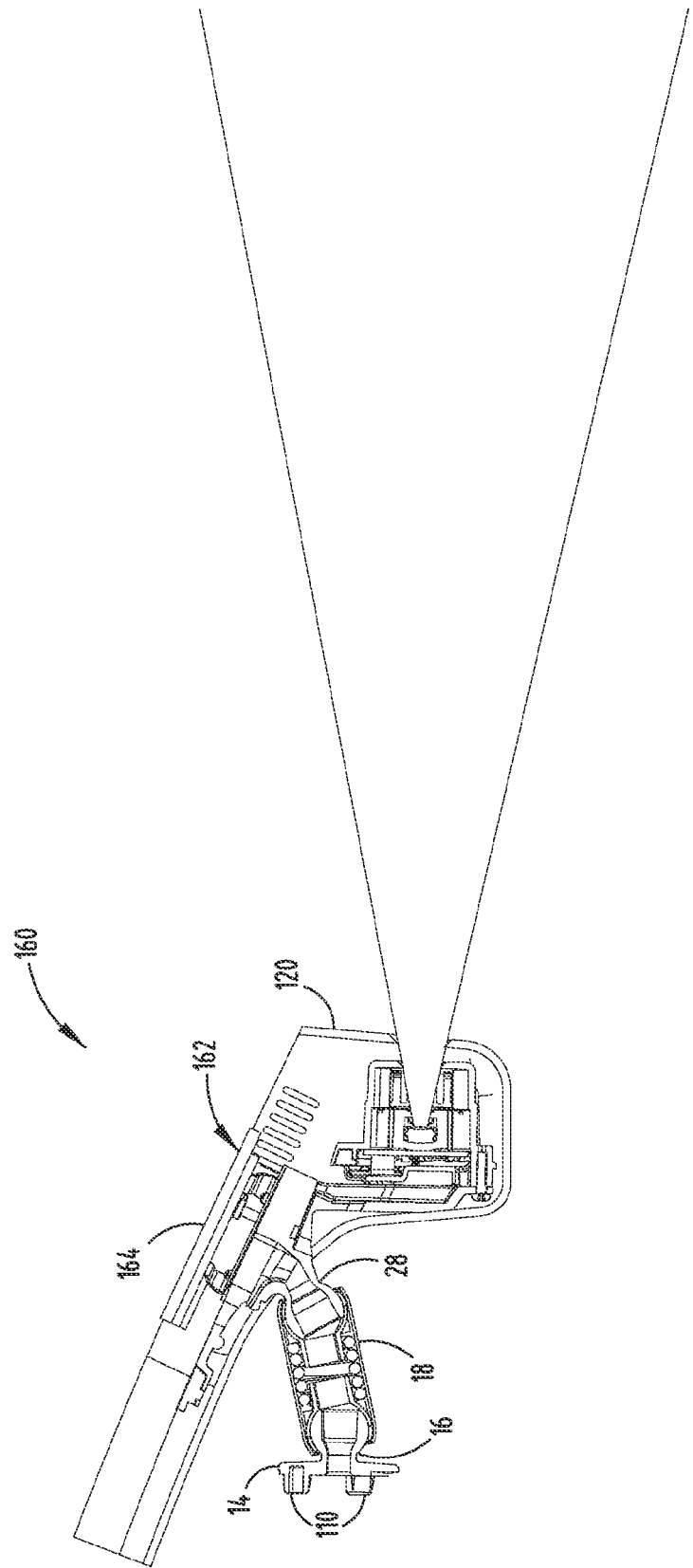

MIRROR MOUNTING ASSEMBLY

CROSS REFERENCE TO RELATED APPLICATION

This application claims priority to and the benefit under 35 U.S.C. §119(e) of U.S. Provisional Patent Application No. 61/693,359 entitled "MIRROR MOUNTING ASSEMBLY," filed Aug. 27, 2012, the entire disclosure of which is incorporated herein by reference.

BACKGROUND OF THE INVENTION

Rearview mirror mounting assemblies are generally used to secure rearview mirrors to an interior surface of windshields.

SUMMARY OF THE INVENTION

One aspect of the present invention includes a mirror mounting assembly for a rearview mirror, including a housing connector having a first pivot member which is operably connected with a first end of an extension tube. A mount has a windshield bracket and a sensor assembly. The windshield bracket is proximate to the sensor assembly and supports the sensor assembly against a vehicle windshield. A second pivot member has a first side operably connected with a second end of the extension tube and a second side operably connected with the mount.

Another aspect of the present invention is in a mirror mounting assembly that includes an extension tube with a first end with a first pivot member and a second end with a second pivot member. A mount is attached to the second pivot member. The mount has a sensor assembly and a windshield bracket secured thereto. The windshield bracket is proximate to the sensor assembly and supports the sensor assembly against a vehicle windshield.

Yet another aspect of the present invention includes a method of making a mirror mounting assembly, including operably connecting a mirror housing with an extension tube having a first end with a first pivot member and a second end having a second pivot member. A windshield bracket having a sensor receiving area is formed. A sensor assembly is operably secured in the sensor receiving area of the windshield bracket. A mount is operably connected to the windshield bracket. The mount is operably connected to the second pivot member.

These and other aspects, objects, and features of the present invention will be understood and appreciated by those skilled in the art upon studying the following specification, claims, and appended drawings.

BRIEF DESCRIPTION OF THE DRAWINGS

FIG. 45 is a top front perspective view of a high resolution camera cover of the present invention;

FIG. 46 is a front elevational view of the cover of FIG. 45;

FIG. 47 is a rear elevational view of the cover of FIG. 45;

FIG. 48 is a side elevational view of the cover of FIG. 45;

FIG. 49 is a top plan view of the cover of FIG. 45;

FIG. 50 is a bottom plan view of the cover of FIG. 45;

FIG. 56 is a cross-sectional view taken along line LVI-LVI of FIG. 53.

DETAILED DESCRIPTION OF EMBODIMENTS

Figure 1:
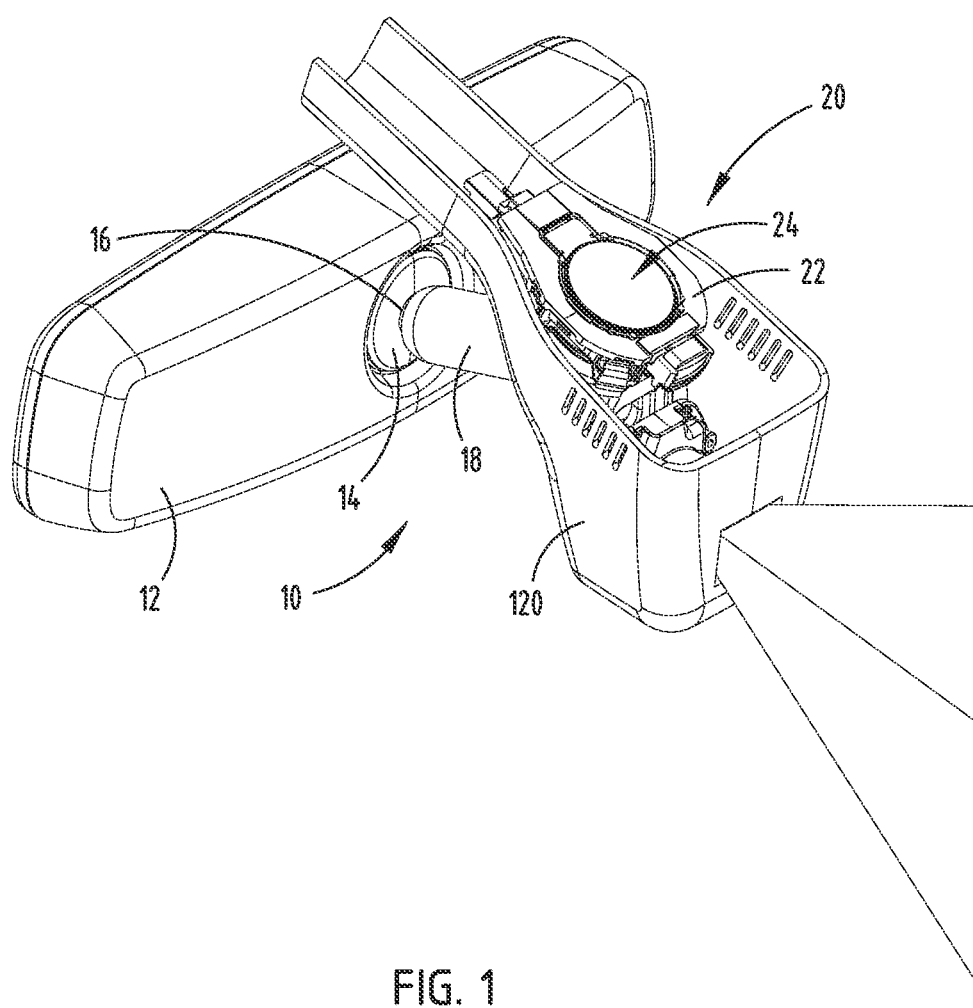
FIG. 1 is a top rear perspective view of one embodiment of a multi-pivot mirror mounting assembly of the present invention.
Figure 2:
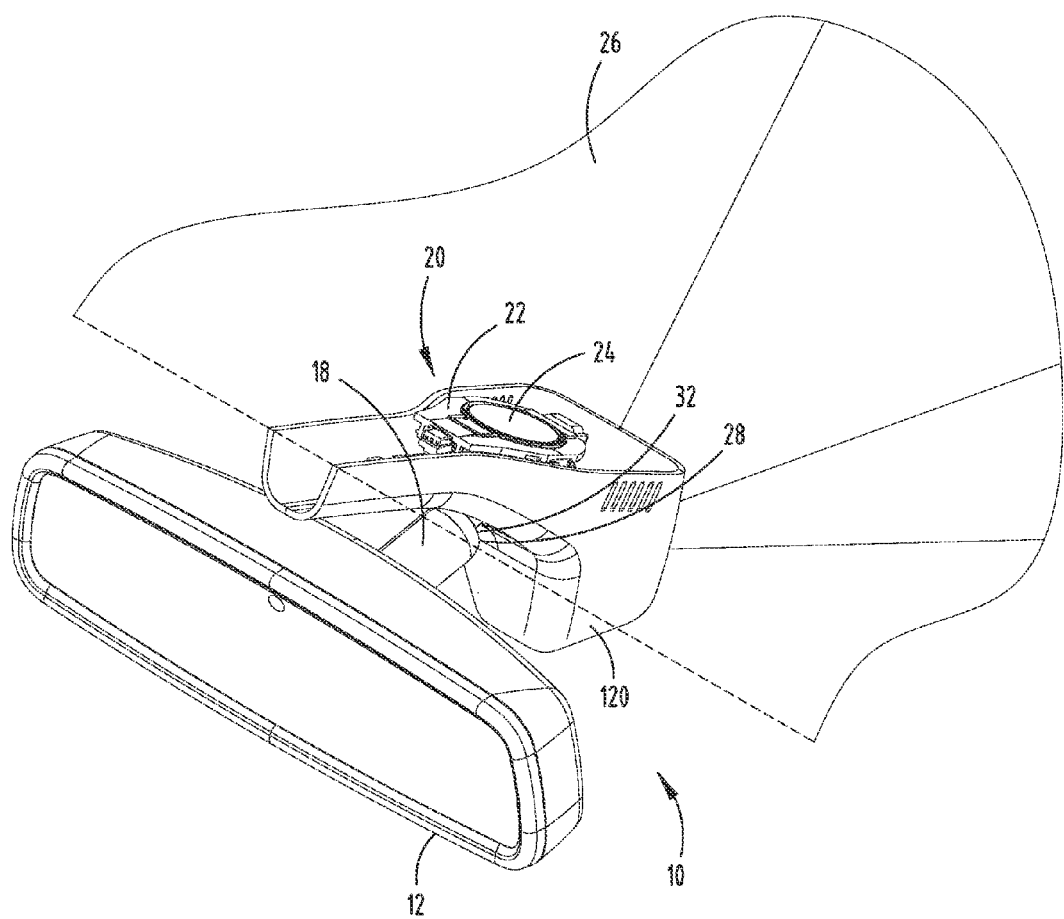
FIG. 2 is a top front perspective view of the multi-pivot mirror mounting assembly of FIG. 1.
Figure 3:
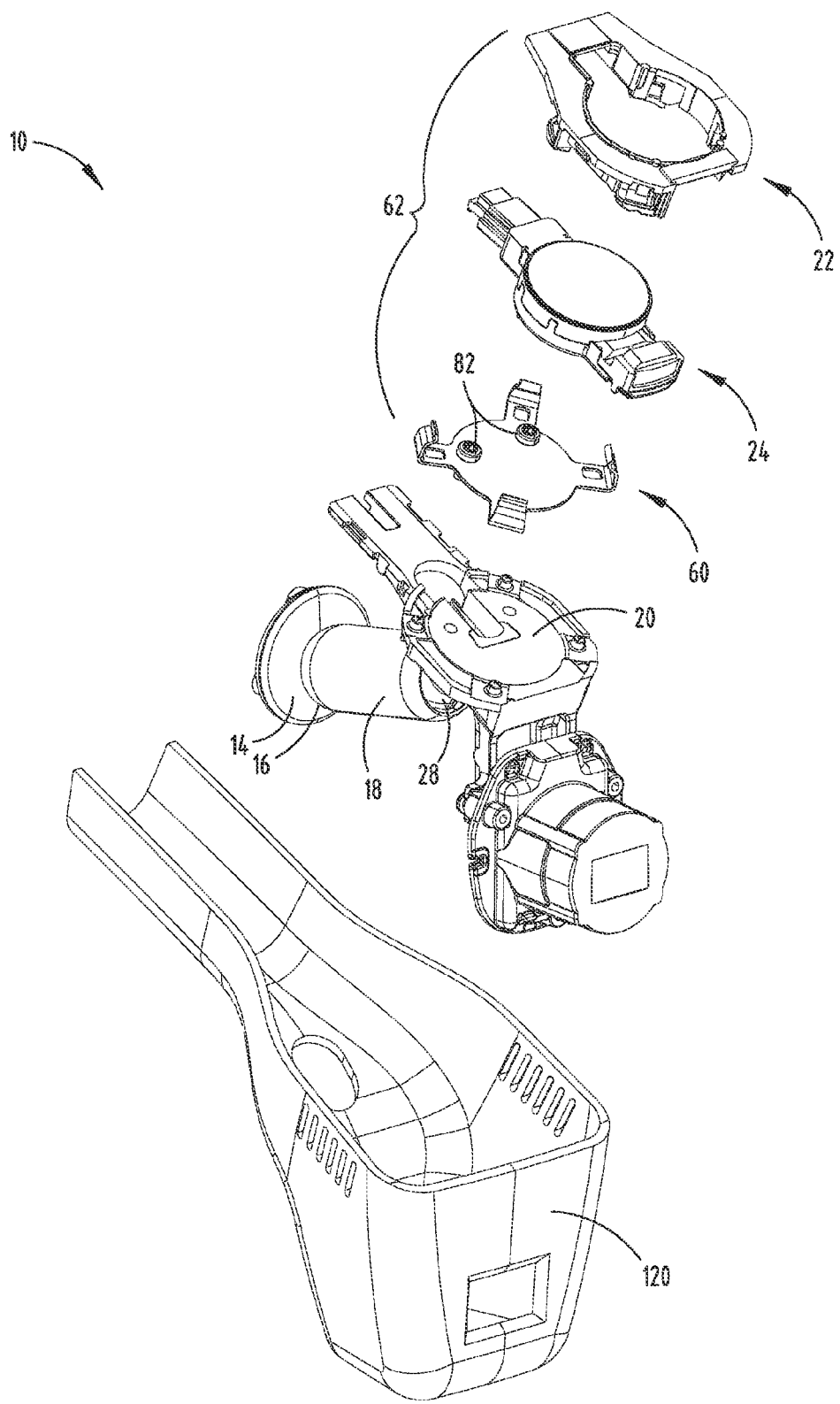
FIG. 3 is a forward exploded perspective view of the a multi-pivot mirror mounting assembly of FIG. 1.
Figure 4:
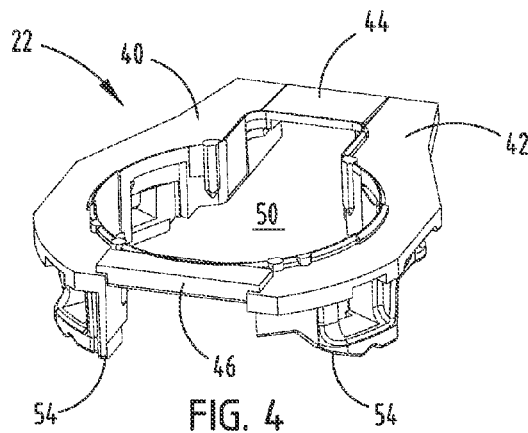
FIG. 4 is a top front perspective view of one embodiment of a windshield bracket.
Figure 5:
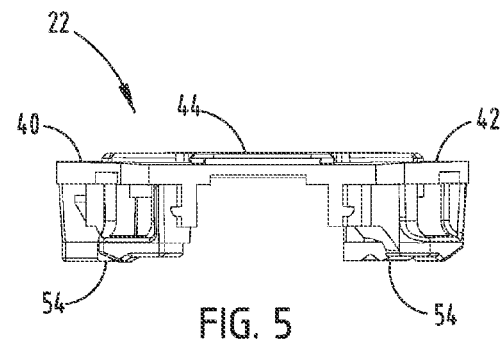
FIG. 5 is a front elevational view of the windshield bracket of FIG. 4.
Figure 6:
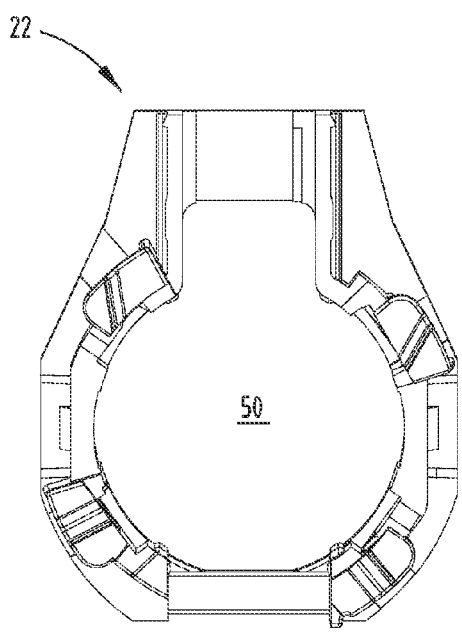
FIG. 6 is a bottom plan view of the windshield bracket of FIG. 4.
Figure 7:
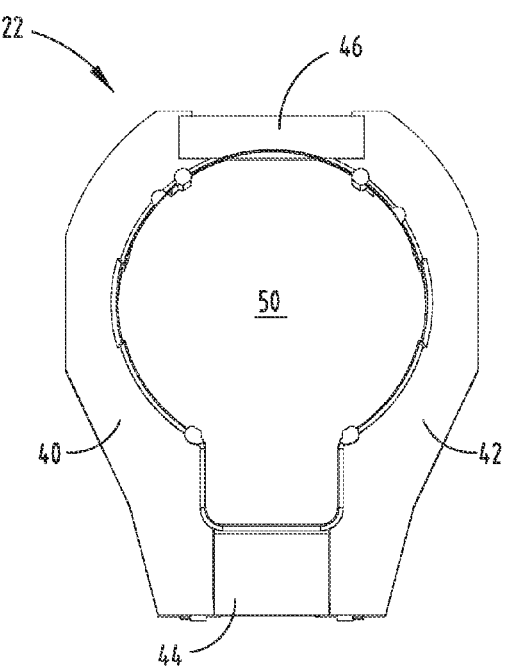
FIG. 7 is a top plan view of the windshield bracket of FIG. 4.
Figure 8:
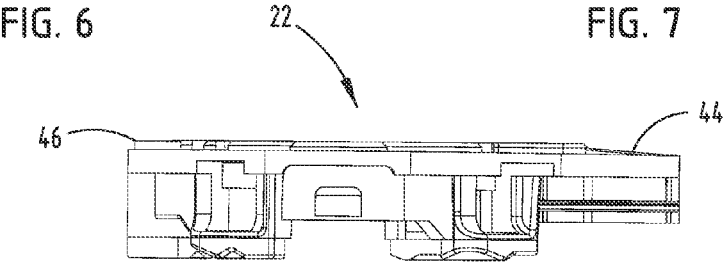
FIG. 8 is a side elevational view of the windshield bracket of FIG. 4.
Figure 9:
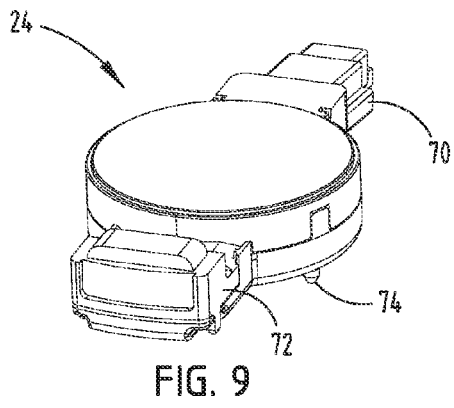
FIG. 9 is a top front perspective view of one embodiment of a mount sensor assembly.
Figure 10:
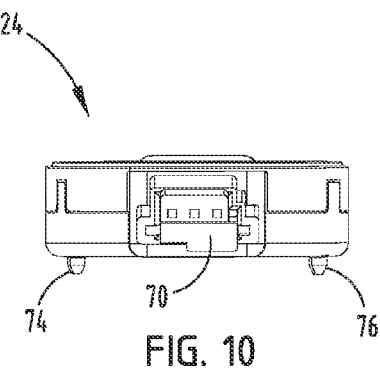
FIG. 10 is a rear elevational view of the mount sensor assembly of FIG. 9.
Figure 11:
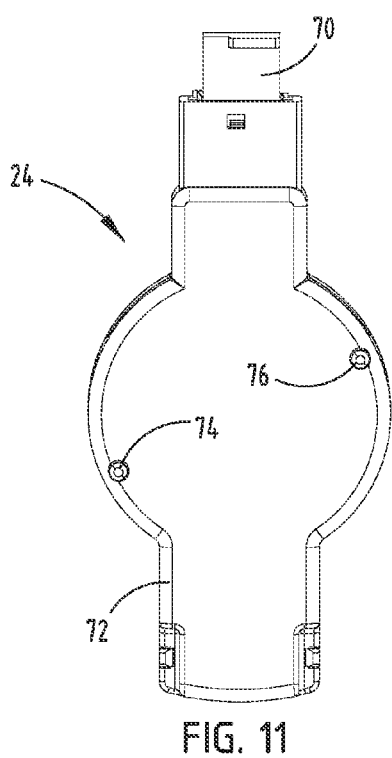
FIG. 11 is a bottom plan view of the mount sensor assembly of FIG. 9.
Figure 12:
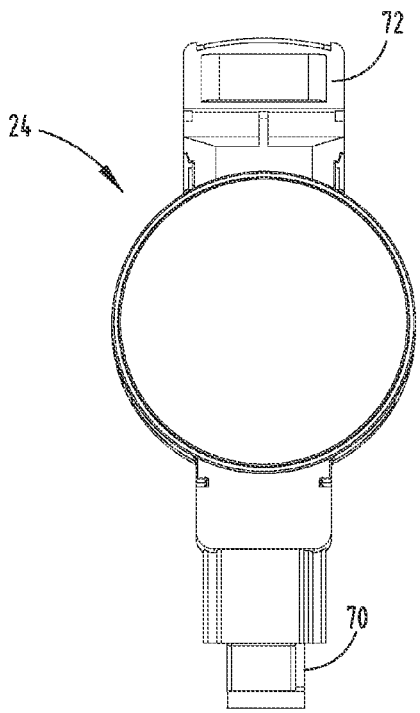
FIG. 12 is a top plan view of the mount sensor assembly of FIG. 9.
Figure 13:
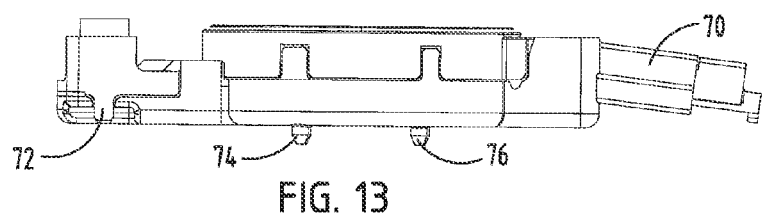
FIG. 13 is a side elevational view of the mount sensor assembly of FIG. 9.
Figure 14:
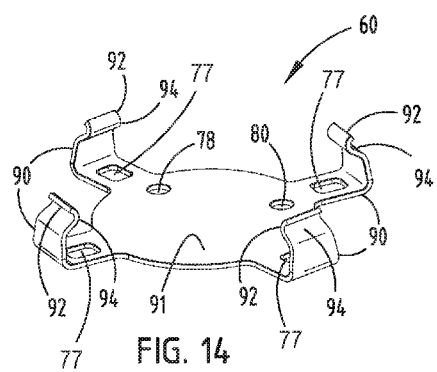
FIG. 14 is a top front perspective view of one embodiment of a spring clip.
Figure 15:
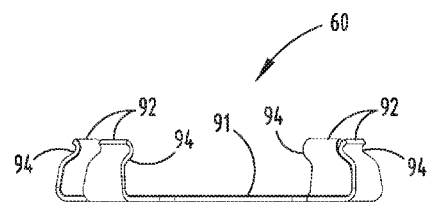
FIG. 15 is a front elevational view of the spring clip of FIG. 14.
Figure 16:
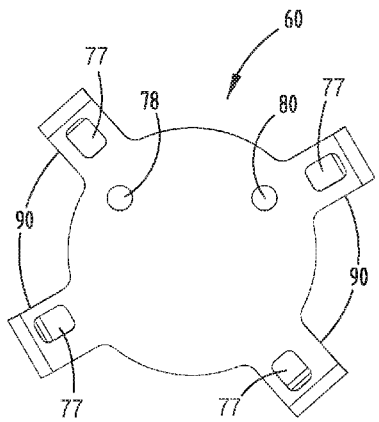
FIG. 16 is a bottom plan view of the spring clip of FIG. 14.
Figure 17:
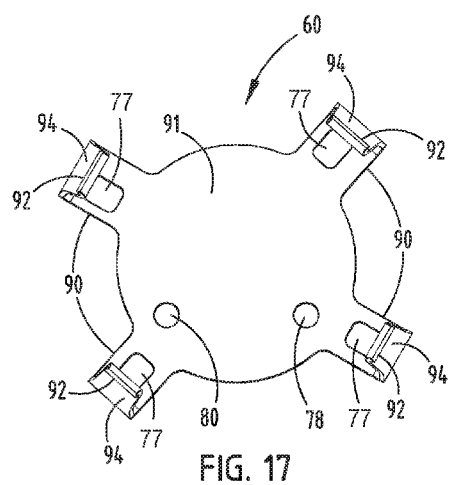
FIG. 17 is a top plan view of the spring clip of FIG. 14.
Figure 18:
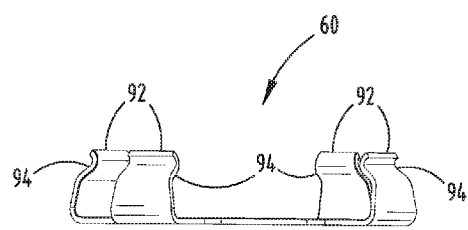
FIG. 18 is a side elevational view of the spring clip of FIG. 14.
Figure 19:
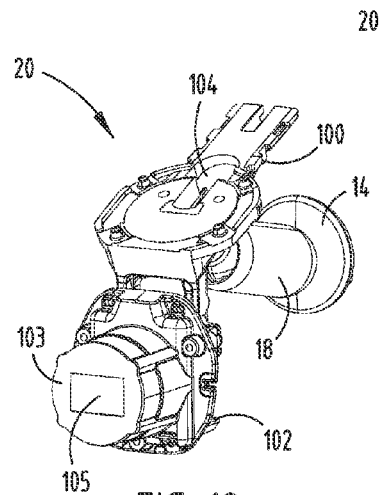
FIG. 19 is a top front perspective view of one embodiment of a mount of the present invention.
Figure 20:
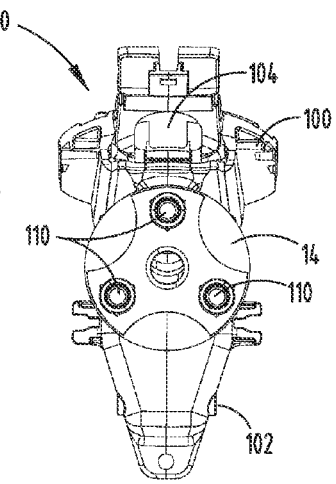
FIG. 20 is a rear elevational view of the mount of FIG. 19.
Figure 21:
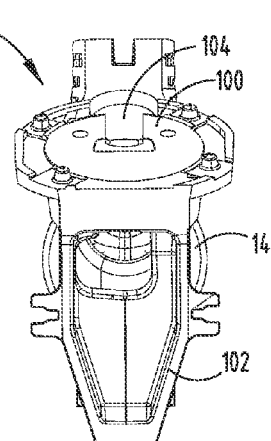
FIG. 21 is a front elevational view of the mount of FIG. 19.
Figure 22:
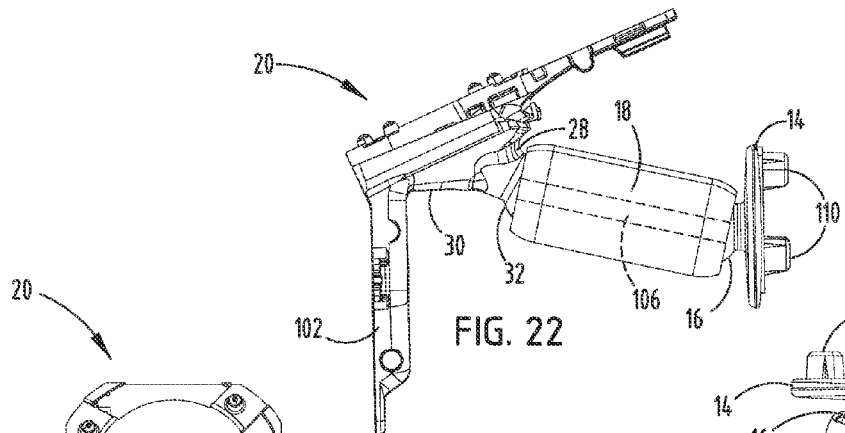
FIG. 22 is a side elevational view of the mount of FIG. 19.
Figure 23:
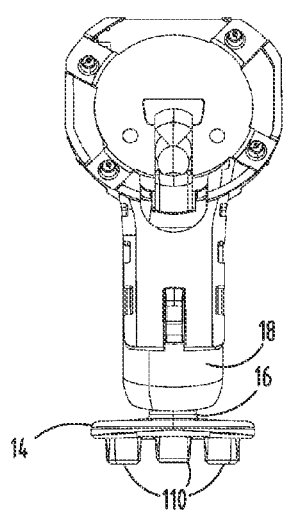
FIG. 23 is a top plan view of the mount of FIG. 19.
Figure 24:
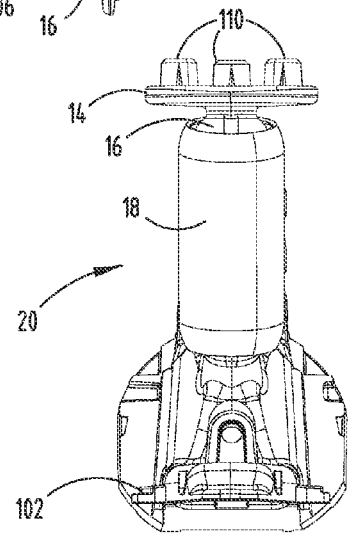
FIG. 24 is a bottom plan view of the mount of FIG. 19.
Figure 25:
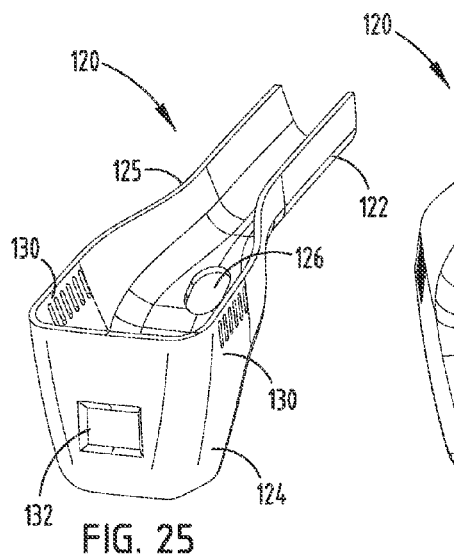
FIG. 25 is a top front perspective view of the one embodiment of a cover of the present invention.
Figure 26:
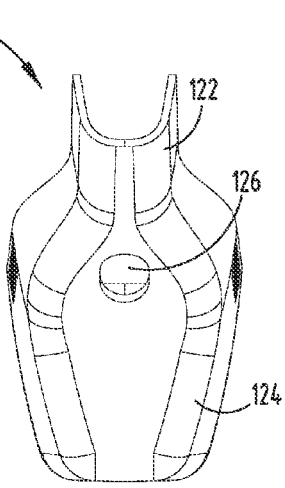
FIG. 26 is a rear elevational view of the cover of FIG. 25.
Figure 27:
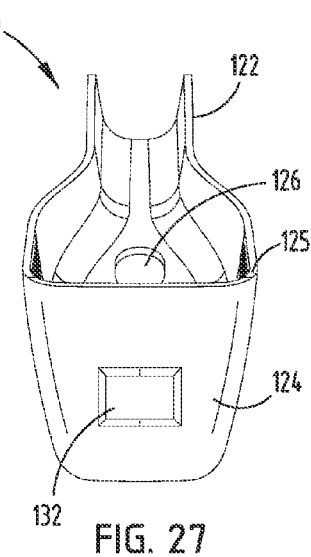
FIG. 27 is a front elevational view of the cover of FIG. 25.
Figure 28:
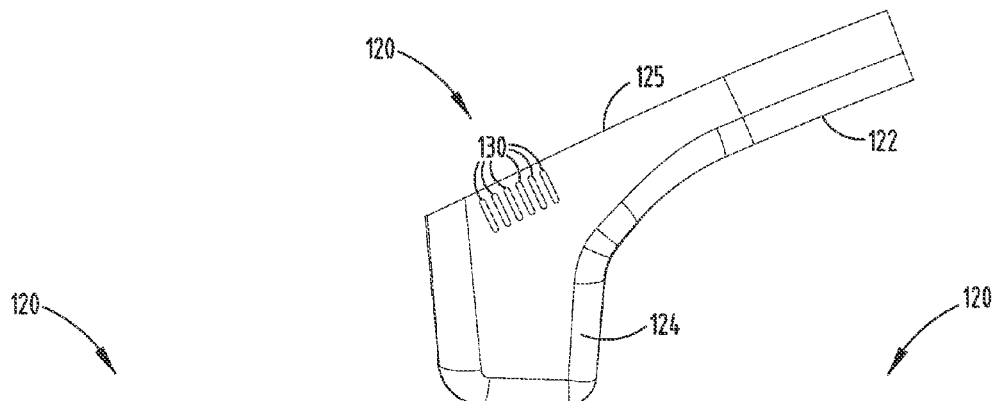
FIG. 28 is a side elevational view of the cover of FIG. 25.
Figure 29:
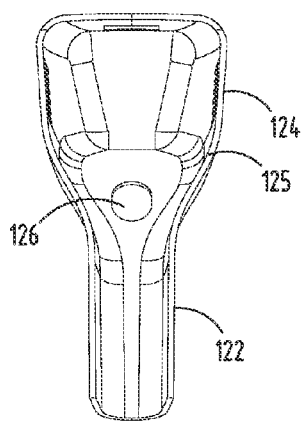
FIG. 29 is a top plan view of the cover of FIG. 25.
Figure 30:
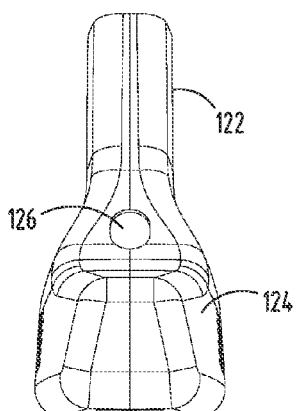
FIG. 30 is a bottom plan view of the cover of FIG. 25.
Figure 31:
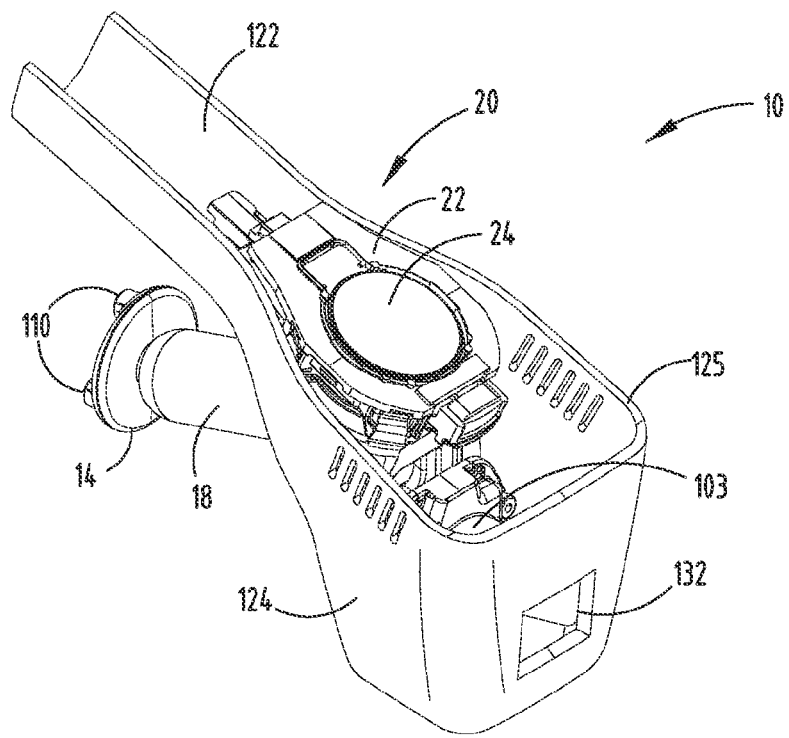
FIG. 31 is a forward top perspective view of the mirror mounting assembly of FIG. 2.
Figure 32:
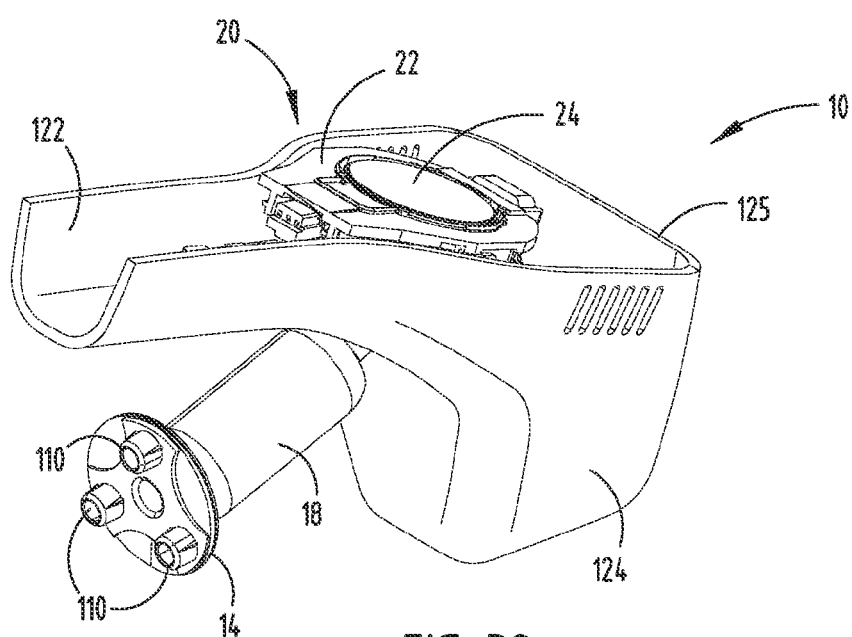
FIG. 32 is a rear top perspective view of the mirror mounting assembly of FIG. 31.
Figure 33:
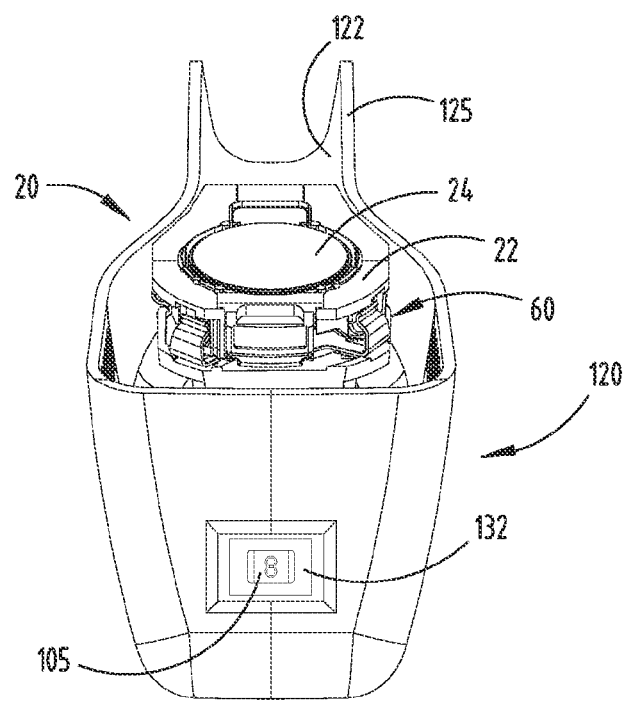
FIG. 33 is a front elevational view of the mirror mounting assembly of FIG. 31.
Figure 34:
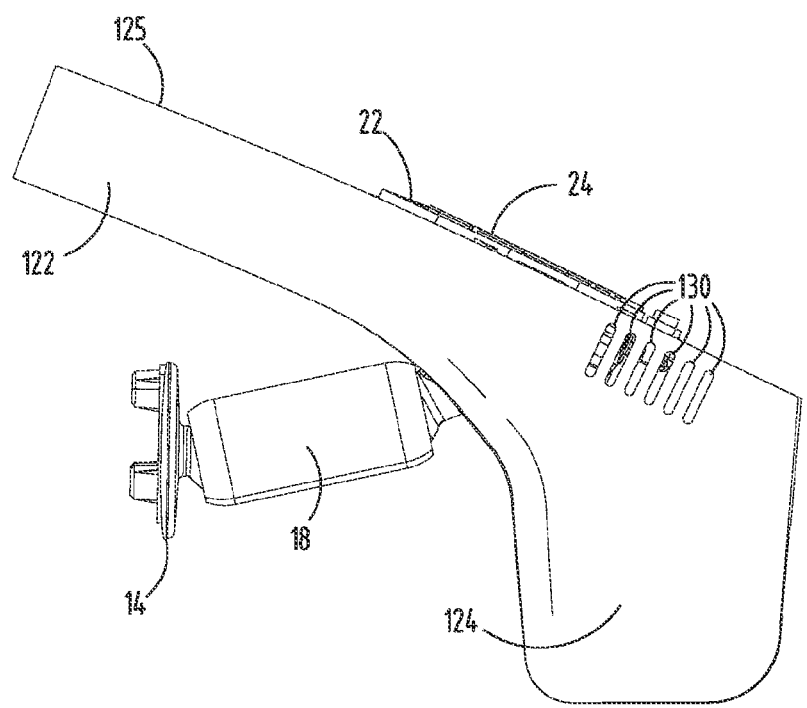
FIG. 34 is a side elevational view of the mirror mounting assembly of FIG. 31.
Figure 35:
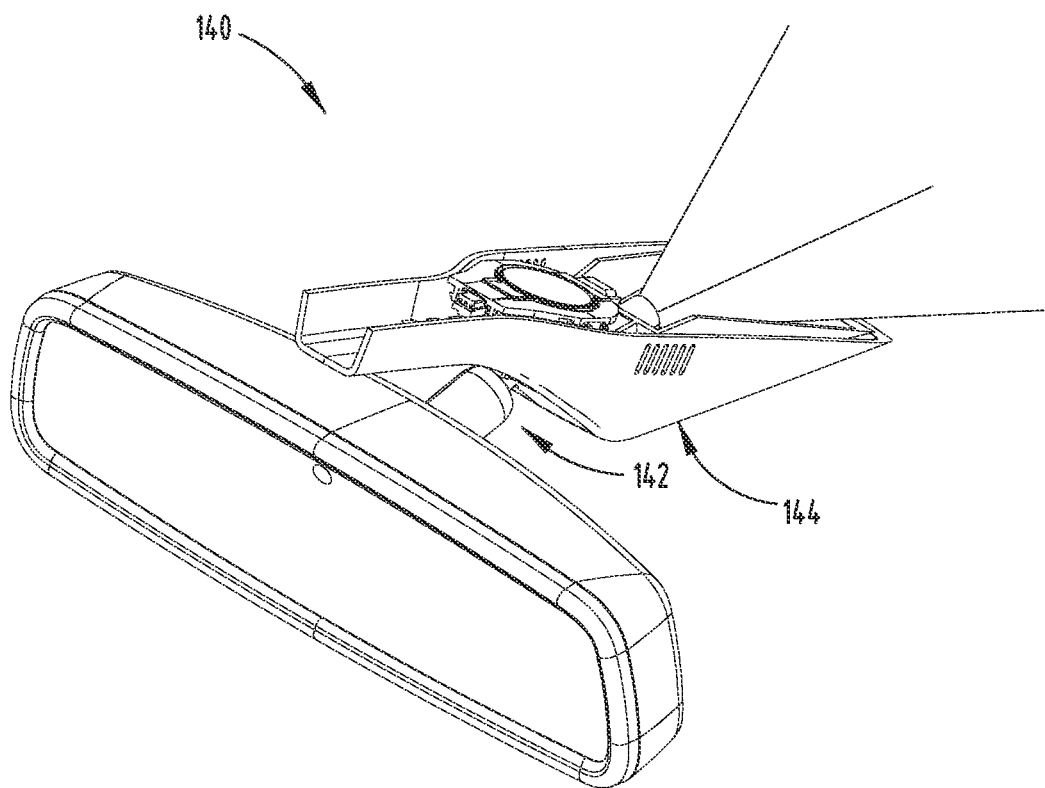
FIG. 35 is a top front perspective view of another embodiment of a mirror mounting assembly of the present invention with a rearview mirror attached.
Figure 36:
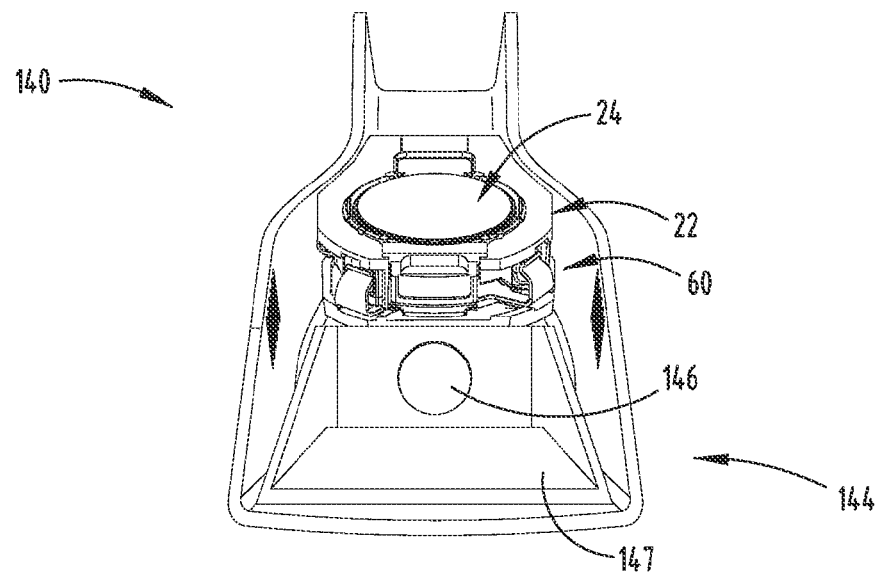
FIG. 36 is a front elevational view of the mirror mounting assembly of FIG. 35.
Figure 37:
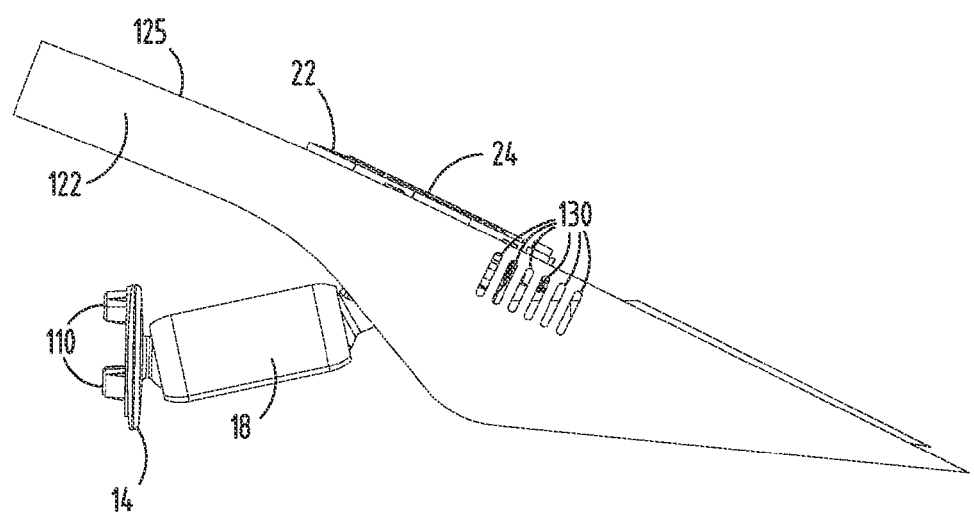
FIG. 37 is a side elevational view of the mirror mounting assembly of FIG. 35.

For purposes of description herein, the terms "upper," "lower," "right," "left," "rear," "front," "vertical," "horizontal," and derivatives thereof shall relate to the invention as oriented in FIG. 1-3. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Single-pivot mounting assemblies for rearview mirrors, although simple in construction, provide limited range of motion to accommodate varying angles of windshield slope across multiple car lines as well as drivers of varying heights. Single-pivot assemblies have a range of motion that is generally, approximately, 25 degrees left of center and right of center as well as 10 degrees up and 20 degrees down. As a result, multi-pivot mounting assemblies are often introduced to provide vehicle manufacturers with a larger range of motion to fit various cars with various windshield angles. The range of motion for a multi-pivot mounting assembly is generally, approximately, 45 degrees left of center and right of center as well as 45 degrees up from center and down from center. With the added advantage of range, however, comes limited ability to mount or support modules that are generally provided near the rearview mirror and windshield. The plates that are typically provided with multi-pivot mounting assemblies are generally very bulky and consume large quantities of windshield viewing area, which can create an unaesthetic viewing device from both inside and outside the vehicle.

Referring to the embodiment illustrated in FIGS. 1-3, the reference numeral 10 generally designates a mirror mounting assembly for a rearview mirror housing 12. The mirror mounting assembly 10 includes a housing connector 14 having a first pivot member 16 operably connected with an extension tube 18. The mirror mounting assembly 10 also includes a mount 20 having a windshield bracket 22 and a sensor assembly 24, wherein the windshield bracket 22 is integrated with the sensor assembly 24. The windshield bracket 22 (also commonly referred to as the windshield button) may support the sensor assembly 24 against a vehicle windshield 26, or an interior mechanism may support the sensor assembly against the windshield 26. A second pivot member 28 has a first end 30 operably connected with the extension tube 18 and a second end 32 operably connected with the mount 20.

Referring now to the embodiment of the windshield bracket 22, as illustrated in FIGS. 4-8, the windshield bracket 22 includes first and second abutment portions 40, 42 adapted to be secured to the vehicle windshield 26. The first and second abutment portions 40, 42 are generally secured by adhesive, although other possible connecting mediums, including fasteners, may also be used. Top and bottom horizontal supports 44, 46 extend between the first and second abutment portions 40, 42 and provide additional strength and rigidity to the windshield bracket 22. The top and bottom horizontal supports 44, 46, as well as the first and second abutment portions 40, 42 generally define a central aperture 50 adapted to receive the sensor assembly 24. The central aperture 50 in the embodiment depicted in FIGS. 4-8 is generally circular. It is generally contemplated that the windshield bracket 22 may have different constructions, wherein only one of the first and second abutment portions 40, 42 is present. It is also conceived that one or both of the top and bottom horizontal supports 44, 46 could be removed from the windshield bracket 22. Receiving members 54 extend below the first and second abutment portions 40, 42 and are adapted to detachably connect with a spring clip 60 (FIGS. 14-18), as disclosed in further detail below. Although the windshield bracket 22 is shown with a cam lock 62 (FIG. 3) or twist lock design, it is contemplated that other constructions are possible, including slide-in assemblies with geometries that allow for the mount 20 to slide into engagement with the windshield bracket 22 by sliding in from the top, bottom or either side, at any circumferential angle. Other engagement interfaces, such as screw-in assemblies, may also be utilized, as understood by a person having ordinary skill in the art.

Referring now to FIGS. 9-13, the illustrated embodiment of the sensor assembly 24 is designed for insertion into the central aperture 50 of the windshield bracket 22 (FIGS. 4-8). It is contemplated that the sensor assembly 24 may include any of several possible sensors, including, but not limited to, a low resolution camera, a high resolution camera, a humidity sensor, a rain sensor, an antenna, a highbeam headlamp sensor, a solar sensor, or a headlamp on/off sensor. However, rain sensors and humidity sensors are frequently disposed in the central aperture 50 because the other aforementioned sensors are more easily connected with the overall windscreen management system at other locations. It is also contemplated that the sensor assembly 24 may include multiple individual sensors. For example, a rain sensor and a humidity sensor may both be present simultaneously in the sensor assembly 24. The sensor assembly 24 is inserted into the central aperture 50 into abutting contact with the windshield 26. The sensor assembly 24 includes a plug end 70 adapted to interface with a wiring harness (not shown) that relays information from the sensor assembly 24 to a controller (not shown) that interprets the information gathered by the sensor assembly 24. The information gathered from the sensor assembly 24 may be used to control functions in the vehicle, including functions directly involved with the rearview mirror mounted with the mounting assembly 10. As a non-limiting example, the mirror mounted with the mounting assembly 10 can be an electrochromic mirror, and the sensor assembly 24 may be used to control certain functions of the electrochromic mirror. A forward end 72 of the sensor assembly 24 includes an engagement member adapted to abut the windshield bracket 22. First and second downward extending protuberances 74, 76 engage with locating features in the form of locating apertures 77 of the spring dip 60, as disclosed in further detail below.

Referring now to FIG. 14-18, one embodiment of the spring clip 60 is illustrated. During assembly, the spring clip 60 is mechanically fastened via mechanical fasteners 82 (FIG. 3) to the mount 20. Other devices, such as springs, adhesive, and interference fit mechanisms can also be used to secure the spring clip in place. In the illustrated embodiment, the mechanical fasteners 82 extend through the spring apertures 78, 80 and frictionally engage the mount 20. The spring clip 60 includes four legs 90 that extend radially outwardly from a planar center portion 91 of the spring clip 60. Each leg 90 includes a distal end 92 that extends orthogonally to the planar center portion 91 of the spring clip 60. The distal ends 92 each include an outwardly facing hook 94 that is adapted to interface with the receiving members 54 disposed on the windshield bracket 22. During installation, the spring clip 60 is turned in a clockwise or counterclockwise fashion, one quarter turn, which consequently, as a result of the angled surface on the receiving members 54 of the windshield bracket 22, causes the spring clip 60 to removably secure the sensor assembly 24 against the windshield bracket 22. As mentioned above, the spring clip 60 is connected with the mount 20 via the mechanical fasteners 82, such that the windshield bracket 22, sensor assembly 24, spring clip 60, mount 20, and mirror housing 12 are operably connected.

The mount 20 illustrated in FIGS. 19-24 includes a bracket engagement member 100 and a camera engagement member 102. The camera engagement member 102 extends generally downward while the bracket engagement member 100 extends generally parallel and adjacent to the windshield 26. The camera engagement member 102 is designed to operably connect with and support a camera housing 103 that includes a high or low resolution camera 105 disposed therein. The bracket engagement member 100 optionally includes a slot 104 for receiving a wiring harness (not shown). The slot 104 may be aligned with a throughway aperture 106 that extends through the second pivot member 28, the extension tube 18, the first pivot member 16, and the housing connector 14. The wiring harness extends through the aperture 106 and relays information gathered by the camera 105 to a control system disposed inside the rearview mirror housing 12. Engagement members 110 extend from the housing connector 14 and are designed to engage the rearview mirror. The aperture 106 optionally accommodates passage of wiring for operation of an electrochromic mirror.

Referring now to the illustrated embodiment of a cover 120 shown in FIGS. 25-30, the cover 120 includes an elongate neck 122 that opens to a body portion 124. The neck 122 and body portion 124 have a continuous planar upper edge 125 designed to closely follow the contour of the windshield 26 and possibly a portion of a vehicle headliner (not shown). A hole 126 extends through the body portion 124. The hole 126 includes a diameter designed to accommodate the outside diameter of the extension tube 18 and the amount the tube 18 can travel. The body portion 124 is designed to accommodate the sensor assembly 24, which may include one or multiple sensors formed integrally together or formed as distinct sensors that occupy the space defined by the central aperture 50. The cover 124 includes vents 130 to minimize damage to the sensor assembly 24 from excessive heat and to allow air flow for the humidity sensor and to manage the climate inside the cover. The cover 120, with its neck 122 and body portion 124, defines an interior volume which is the area enclosed by the cover 120. In one embodiment, the cover 120 includes a closed area of between about 35000 and about 16000 mm². In another embodiment, the cover 120 includes a closed area of between about 2600 and about 2300 mm². In another embodiment, the cover 120 includes a closed area of between about 16000 and about 3000 mm². In another embodiment, the cover 120 includes a closed area of between about 12000 and about 5000 mm². In yet another embodiment, the cover 120 includes a closed area of between about 8000 and about 7000 mm². In another embodiment, the cover 120 includes a closed area of between about 1400 and about 1200 mm². In yet another embodiment, the cover 120 includes a closed area of between about 1350 and about 1250 mm². In one embodiment, the cover 120 includes a tape area of between about 1500 mm² and about 1000 mm². In another embodiment, the cover 120 includes a tape area of between about 1200 mm² and about 1400 mm².

Referring again to FIGS. 25-30, some windscreen management systems utilize high or low resolution cameras, or both, which do not require a cover that is in direct contact with the windshield 26 of a vehicle so as to minimize reflection off the windshield 26. In this instance, the cover 120 may be considerably smaller than traditional covers known in the art. Specifically, the cover 120 includes a forward window 132 adapted to allow a low resolution camera to view objects forward of the windshield 26. However, the size of cover 120 is lessened because the low resolution camera does not need to directly interface with the windshield 26 as is preferred with some forms of cameras. The cover 120 affords protection to the entire mirror mounting assembly 10, but more importantly, minimizes reflection off the windshield.

Referring now to the mirror mounting assembly 10 shown in FIGS. 31-34, the engagement members 110 extending from the housing connector 14 are generally disposed directly below the neck 122 of the cover 120 and the engagement members 110 are generally vertically aligned. The planar upper edge 125 of the cover 120 is generally aligned with the top of the sensor assembly 24 and the windshield bracket 22, with a portion of the sensor assembly 24 and windshield bracket 22 protruding slightly above the planar upper edge 125. Accordingly, after installation, the entire mirror mounting assembly 10 provides a clean, aesthetic design with a relatively small cover 120 that hides the sensor assembly 24 from occupants disposed in the vehicle.

In another embodiment, as shown in FIGS. 35-38, a mirror mounting assembly 140 includes similar components as those described in detail above. However, in the present embodiment, a windshield camera 146 which requires direct interface with the windshield 26 is utilized, which requires a different mount 142 and cover 144.

Figure 38:
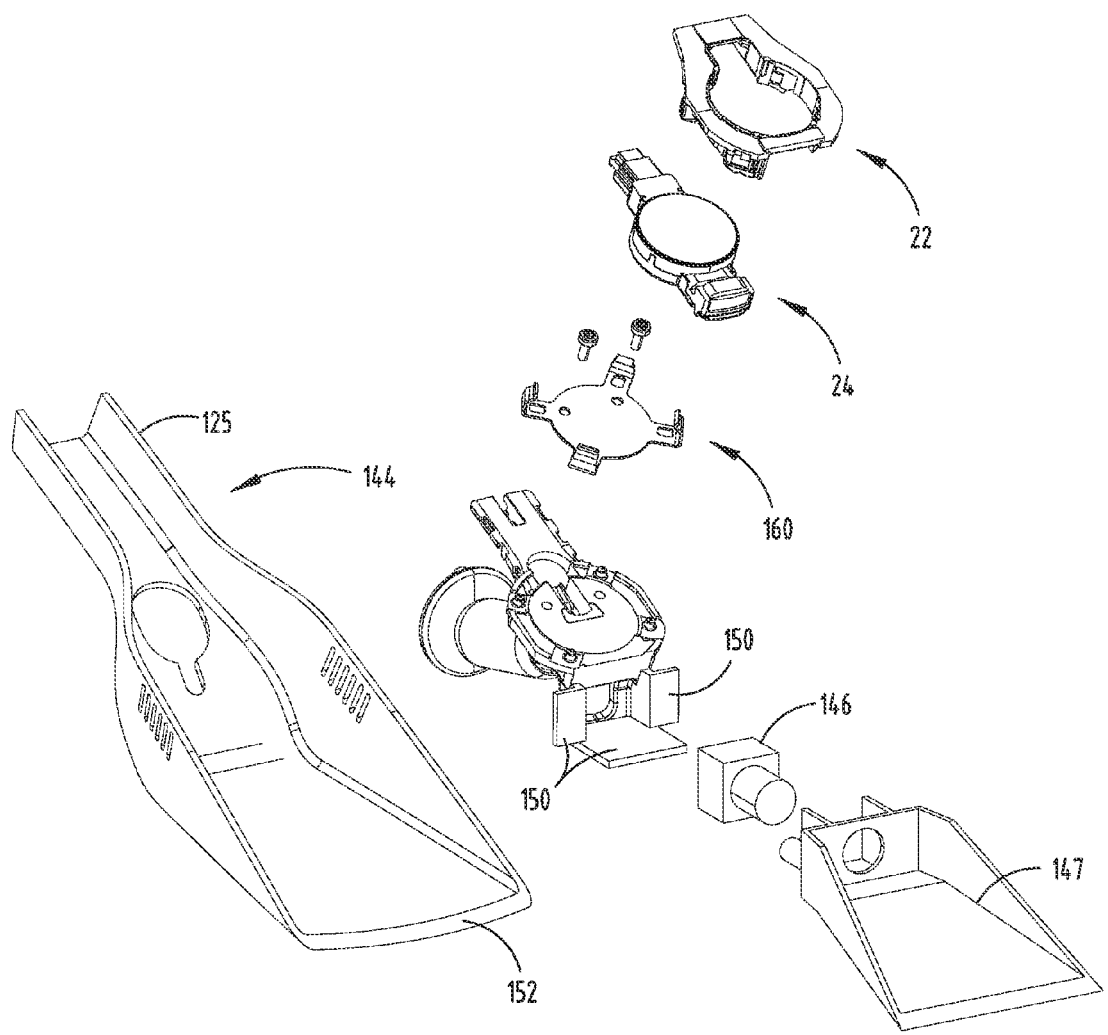
FIG. 38 is a top front exploded perspective view of the mirror mounting assembly of FIG. 35.
Figures 39, 40, 41:
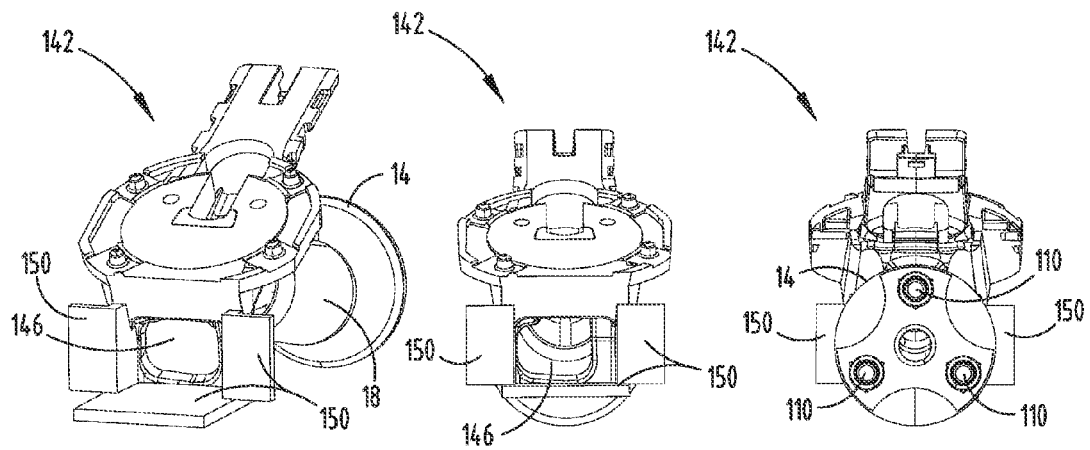
FIG. 39 is a top front perspective view of another embodiment of a mount of the present invention.
FIG. 40 is a front elevational view of the mount of FIG. 39.
FIG. 41 is a rear elevational view of the mount of FIG. 39.
Figure 42:
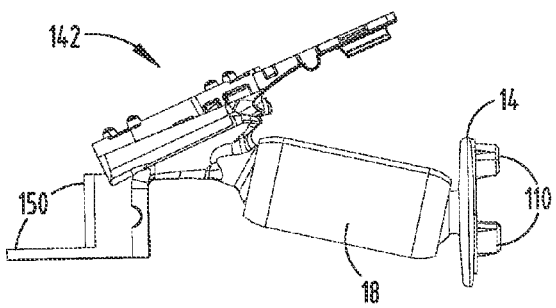
FIG. 42 is a side elevational view of the mount of FIG. 39.
Figures 43, 44:
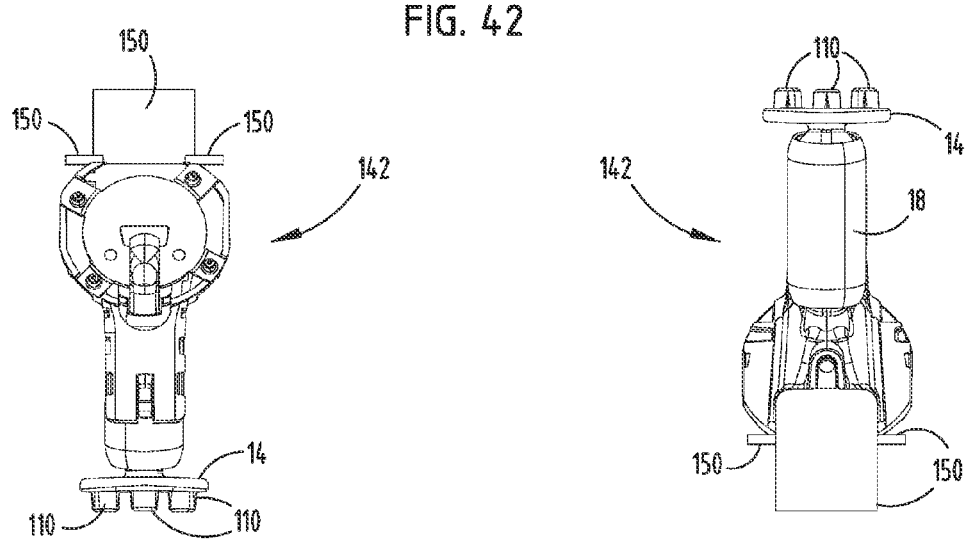
FIG. 43 is a top plan view of the mount of FIG. 39.
FIG. 44 is a bottom plan view of the mount of FIG. 39.
Figure 51:
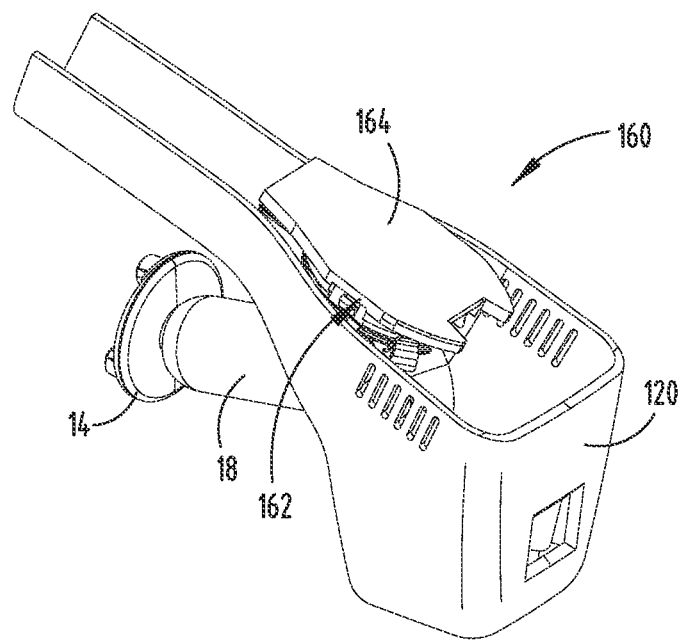
FIG. 51 is a perspective view of another embodiment of a multi-pivot mirror mounting assembly of the present invention.
Figure 52:
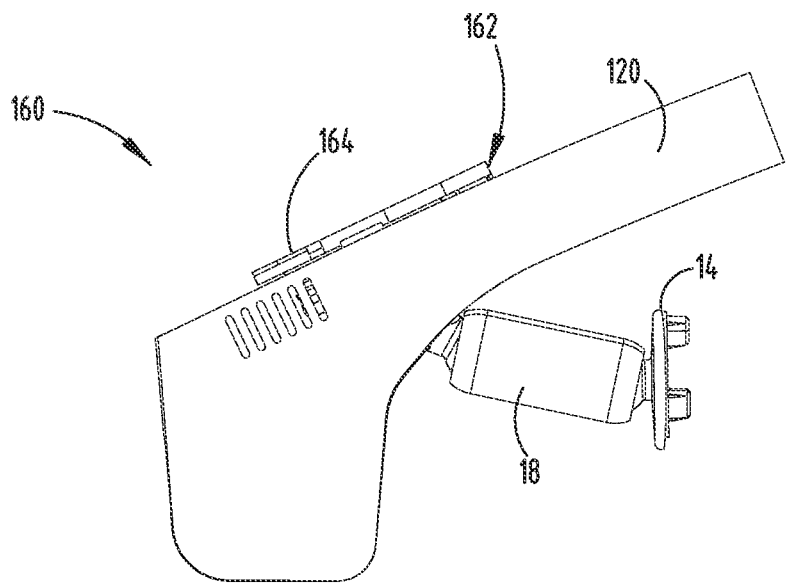
FIG. 52 is a side view of the multi-pivot mirror mounting assembly shown in FIG. 51.
Figure 53:
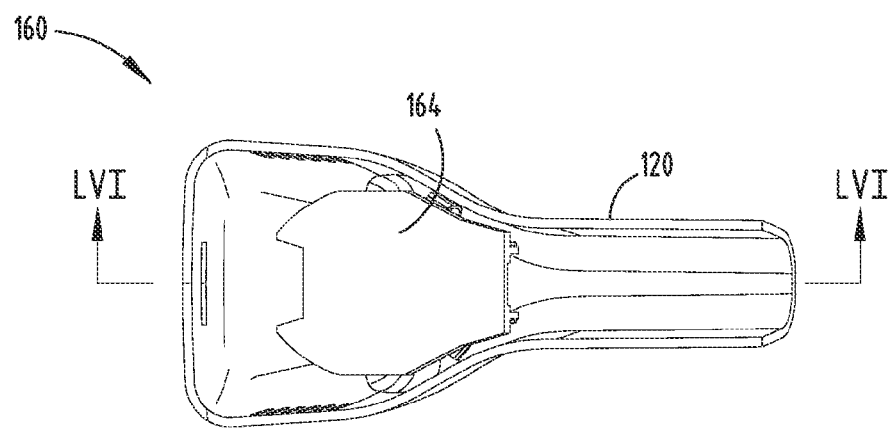
FIG. 53 is a top view of the multi-pivot mirror mounting assembly shown in FIG. 51.
Figure 54:
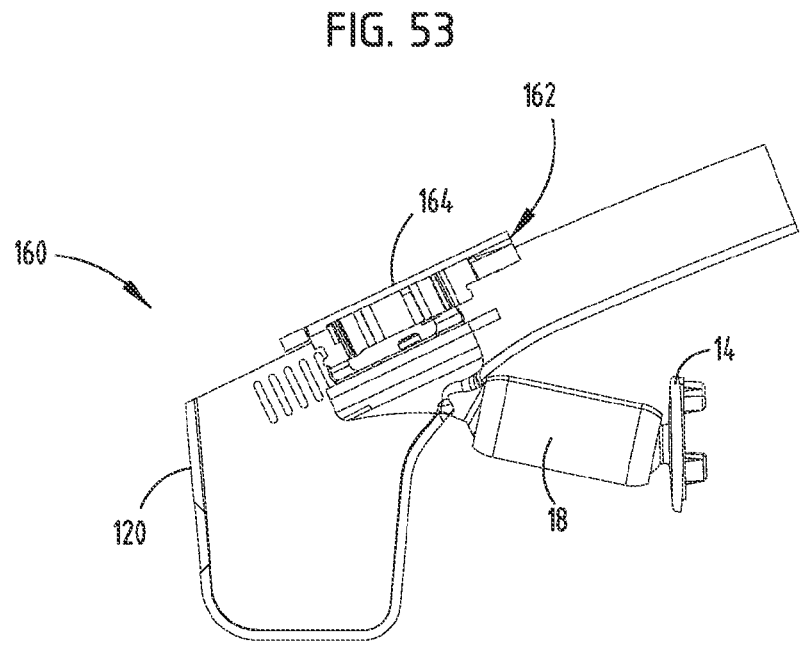
FIG. 54 is a top view of the multi-pivot mirror mounting assembly shown in FIG. 51.
Figure 55:
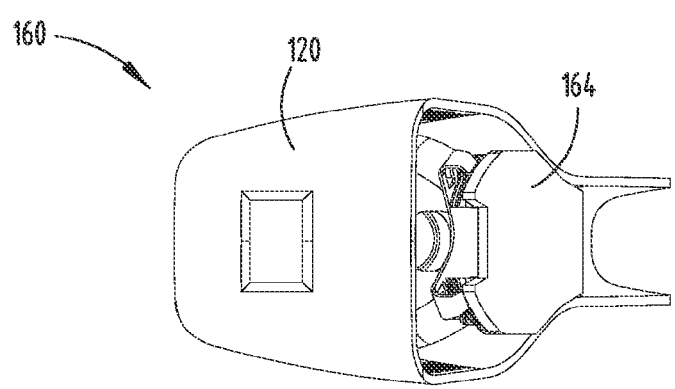
FIG. 55 is a front view of the embodiment of a multi-pivot mirror mounting assembly of FIG. 51.

Referring again to the embodiment illustrated in FIG. 38, the windshield camera 146 extends from a forward portion of the mount 142. The windshield camera 146 is linked to a camera control system that analyzes the information received from the windshield camera 146. A sensor shroud 147 is disposed below the windshield camera 146 and protects the camera from reflections as well as debris that could be misinterpreted by the camera control system. The sensor shroud 147 could be combined with the cover 144 or eliminated completely.

As shown in embodiment illustrated in FIGS. 39-44, the mount 142 of the mirror mounting assembly 140 includes many of the same components as the mount 20. However, the mount 142 includes a shortened extension that can support either a high or low resolution windshield camera 146. The windshield camera 146 is designed for use adjacent to the windshield 26, and there for must be allowed adequate space forward of the mount 142. Reflection-minimizing flanges 150 are disposed on either side and below the windshield camera 146.

Referring now to FIGS. 45-50, the cover 144 extends over the sensor shroud 147 and the high or low resolution windshield camera 146, as well as the mount 20, spring clip 60, sensor assembly 24, and windshield bracket 22. The cover 144 includes many of the features of cover 120 disclosed above. However, a forward portion of the cover 144 includes a forward scoop 152 designed to hide from view and protect the sensor shroud 147. As a result the cover 144 is slightly larger than cover 120. The sensor shroud 147 is configured to provide a specified field of view from the camera 146. A typical field of view for a high resolution camera is approximately 25 degrees to the left, 25 degrees to the right, and a downward angle such that the ground is visible five meters forward of the front of the vehicle. Depending on the kind of camera 146 that is used, the camera 146 can have a field of view that varies left to right and 3 meters to 7 meters forward of the vehicle.

In another embodiment, as shown in FIGS. 51-56, a mirror mounting assembly 160 includes similar components as those described in detail above, and elements that are the same as those shown in previous embodiments are given the same reference number in FIGS. 51-56. However, in the present embodiment, the windshield bracket 162 has a top surface portion 164 which is adapted to be attached to the windshield. The top surface portion 164 is adapted to be flush with the windshield, and does not have a recessed central aperture to receive a sensor assembly. Alternatively, a to convert a windshield bracket 22 when a sensor assembly will not be used, a cover or plate could optionally be attached to the windshield bracket to provide a greater mounting surface for the use of adhesive or other fastening means to attach the windshield bracket 22 to the windshield.

Generally, as disclosed above, the cover for a multi-pivot mounting assembly can be quite large. However, in the instant case, the size of covers 120, 144 is lessened substantially due, in part, to the complimentary sensor assembly 24 and windshield bracket 22 construction.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A mirror mounting assembly for a rearview mirror, comprising:
   a housing connector having a first pivot member which is operably connected with a first end of an extension tube;
   a spring clip having a plurality of legs that each include a locating aperture and a distal end with an outwardly facing hook;
   a mount operably coupled with the spring clip, the outwardly facing hook of each distal end engaging a windshield bracket, wherein the windshield bracket supports a sensor assembly having protuberances engaging the locating apertures of the spring clip against a vehicle windshield; and
   a second pivot member having a first side operably connected with a second end of the extension tube and a second side operably connected with the mount.

2. The mirror mounting assembly of claim 1, wherein the rearview mirror is an electrochromic mirror.

3. The mirror mounting assembly of claim 1, wherein the sensor assembly includes a device chosen from the group consisting of: a high resolution camera, a low resolution camera, a humidity sensor, a rain sensor, a solar sensor, and an antenna.

4. The mirror mounting assembly of claim 1, wherein the sensor assembly includes at least two devices chosen from the group consisting of: a high resolution camera, a low resolution camera, a humidity sensor, a rain sensor, a solar sensor, and an antenna.

5. The mirror mounting assembly of claim 1, wherein the sensor assembly is centrally disposed between a first abutment portion and a second abutment portion of the windshield bracket.

6. The mirror mounting assembly of claim 1, further comprising:
   a windshield camera assembly extending from a second sensor supporting portion of the mount, wherein the windshield camera assembly includes a camera, a camera shroud and a non-reflective glare protector; and
   a cover which at least partially encapsulates the windshield camera assembly and the mount.

7. The mirror mounting assembly of claim 6, wherein the camera is supported in contact with the vehicle windshield by the second sensor supporting portion of the mount.

8. The mirror mounting assembly of claim 1, further comprising:
   a camera engagement member extending downwardly from the mount for attaching a windshield camera assembly; and
   a cover which encapsulates the mount, the camera engagement member, and the camera assembly, and which includes a forward window through which the camera assembly receives image information.

9. The mirror mounting assembly of claim 1, further comprising:
   a cover which at least partially encapsulates the windshield bracket and the sensor assembly, wherein the cover includes vents to permit air flow to the sensor assembly.

10. The mirror mounting assembly of claim 9, wherein the cover has a closed area between about 1250 mm$^2$ and about 35000 mm$^2$.

11. A mirror mounting assembly, comprising:
    an extension tube having a first end with a first pivot member and a second end with a second pivot member;
    a spring clip having a plurality of legs that each include a locating aperture and a distal end with an outwardly facing hook; and
    a mount which is attached to the second pivot member, wherein the spring clip couples the outwardly facing hook of each distal end engaging external receiving members of a windshield bracket, wherein the windshield bracket supports the sensor assembly against a vehicle windshield and accommodates a plug end of the sensor assembly, the plug end being configured to releasably interface with a vehicle wiring harness.

12. The mirror mounting assembly of claim 11, wherein the sensor assembly includes at least two sensors from the group consisting of: a high resolution camera, a low resolution camera, a humidity sensor, a rain sensor, a solar sensor, and an antenna.

13. The mirror mounting assembly of claim 11, further comprising:
    a cam lock system to secure the mount to the windshield bracket, wherein the cam lock system includes the spring clip which is operably secured to the mount, the spring clip having legs with distal ends that are removably secured to the windshield bracket.

14. The mirror mounting assembly of claim 13, wherein sensor assembly is supported between the spring clip and the windshield bracket, and wherein at least a portion of the sensor assembly extends through a central aperture in the windshield bracket to contact the vehicle windshield.

15. The mirror mounting assembly of claim 14, wherein the central aperture in the windshield bracket is generally circular.

16. The mirror mounting assembly of claim 11, wherein the mount includes a forward facing camera mount to support a windshield camera assembly, and further comprising:
   a cover which defines an interior space, and wherein the mount, the sensor assembly, the, windshield bracket, and the windshield camera assembly are at least partially disposed within the interior space, and wherein the cover includes vents to allow air flow into the interior space.

17. The mirror mounting assembly of claim 11, wherein the rearview mirror is an electrochromic mirror, and further comprising:
   a throughway aperture disposed in the extension tube and adapted to receive wiring extending from the sensor assembly and traveling toward the rearview mirror.

18. A method of making a mirror mounting assembly, the method comprising:
   operably connecting a mirror housing with an extension tube having a first end with a first pivot member and a second end with a second pivot member;
   forming a windshield bracket having a central aperture defining a sensor receiving area;
   operably securing a sensor assembly in the sensor receiving area of the windshield bracket;
   providing a spring clip having a plurality of legs that each include a locating aperture and a distal end with an outwardly facing hook
   operably connecting a mount with the spring clip;
   engaging the outwardly facing hook of each distal end with an outer periphery of the windshield bracket; and
   operably connecting the second pivot member to the mount.

19. The method of claim 18, wherein the step of forming a windshield bracket with a sensor receiving area further comprises the steps of:
   forming the sensor receiving area centrally inside the windshield bracket; and
   forming first and second abutment portions on the windshield bracket.

20. The method of claim 18, further comprising the step of:
   extending a camera mounting member downward from a forward portion of the mount; and
   affixing a camera assembly to the camera mounting member.

* * * * *